US009877014B2

(12) United States Patent
Horii

(10) Patent No.: US 9,877,014 B2
(45) Date of Patent: Jan. 23, 2018

(54) STEREO IMAGE DISPLAY APPARATUS AND STEREO IMAGE DISPLAY METHOD

(71) Applicant: FUJIFILM Corporation, Minato-ku, Tokyo (JP)

(72) Inventor: Hirofumi Horii, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 507 days.

(21) Appl. No.: 14/629,893

(22) Filed: Feb. 24, 2015

(65) Prior Publication Data
US 2015/0172642 A1 Jun. 18, 2015

Related U.S. Application Data

(63) Continuation of application No. 13/224,625, filed on Sep. 2, 2011, now Pat. No. 8,994,796.

(30) Foreign Application Priority Data

Jul. 6, 2011 (JP) ................................. 2011-150254
Jul. 6, 2011 (JP) ................................. 2011-150255

(51) Int. Cl.
*H04N 13/04* (2006.01)
*H04N 13/00* (2006.01)

(52) U.S. Cl.
CPC ..... *H04N 13/0409* (2013.01); *H04N 13/0022* (2013.01); *H04N 13/0454* (2013.01)

(58) Field of Classification Search
CPC ........... H04N 13/0022; H04N 13/0409; H04N 13/0454
See application file for complete search history.

(56) References Cited

U.S. PATENT DOCUMENTS

2004/0169617 A1* 9/2004 Yelton ..................... G06T 15/04
345/1.1
2006/0126919 A1 6/2006 Kitaura et al.
(Continued)

FOREIGN PATENT DOCUMENTS

JP 10-040420 A 2/1998
JP 11-164328 A 6/1999
(Continued)

OTHER PUBLICATIONS

Notification of Reasons for Rejection, dated May 10, 2012, issued in corresponding JP Application No. 2009-039724, 6 pages in English and Japanese.
(Continued)

*Primary Examiner* — Anner N Holder
(74) *Attorney, Agent, or Firm* — Sughrue Mion, PLLC

(57) ABSTRACT

A stereo image display apparatus that causes a display device to display a stereo image having a parallax, wherein a stereo image of a currently displayed frame is advanced frame by frame to a stereo image of the next frame in response to a frame-by-frame advance indication, the apparatus comprising: a frame-by-frame advancing device that, once frame-by-frame advance is indicated, switches the stereo image of the current frame on the display with a parallaxless image of the current frame, thereafter advances the image frame by frame to display a parallaxless image of the next frame, and further thereafter displays a stereo image of the next frame on the display device, wherein the frame-by-frame advancing device performs the frame-by-frame advance with sliding-out/sliding-in.

19 Claims, 14 Drawing Sheets

(56) References Cited

U.S. PATENT DOCUMENTS

| | | | |
|---|---|---|---|
| 2007/0236493 | A1 | 10/2007 | Horiuchi et al. |
| 2008/0151044 | A1* | 6/2008 | Sawachi ................. G01S 11/12 348/51 |
| 2009/0103833 | A1 | 4/2009 | Mitsuhashi et al. |
| 2009/0185029 | A1 | 7/2009 | Mitsuhashi et al. |
| 2010/0303444 | A1* | 12/2010 | Sasaki ................. G11B 27/105 386/248 |
| 2011/0292186 | A1* | 12/2011 | Okuda ............... H04N 13/0022 348/51 |
| 2012/0011473 | A1 | 1/2012 | Ohkubo et al. |

FOREIGN PATENT DOCUMENTS

| | | |
|---|---|---|
| JP | 2005109568 A | 4/2005 |
| JP | 2008005203 A | 1/2008 |
| JP | 2008042645 A | 2/2008 |
| JP | 2008306739 A | 12/2008 |

OTHER PUBLICATIONS

Notification of Reasons for Rejection, dated Feb. 21, 2012, issued in corresponding JP Application No. 2009-039724, 5 pages in English and Japanese.

\* cited by examiner

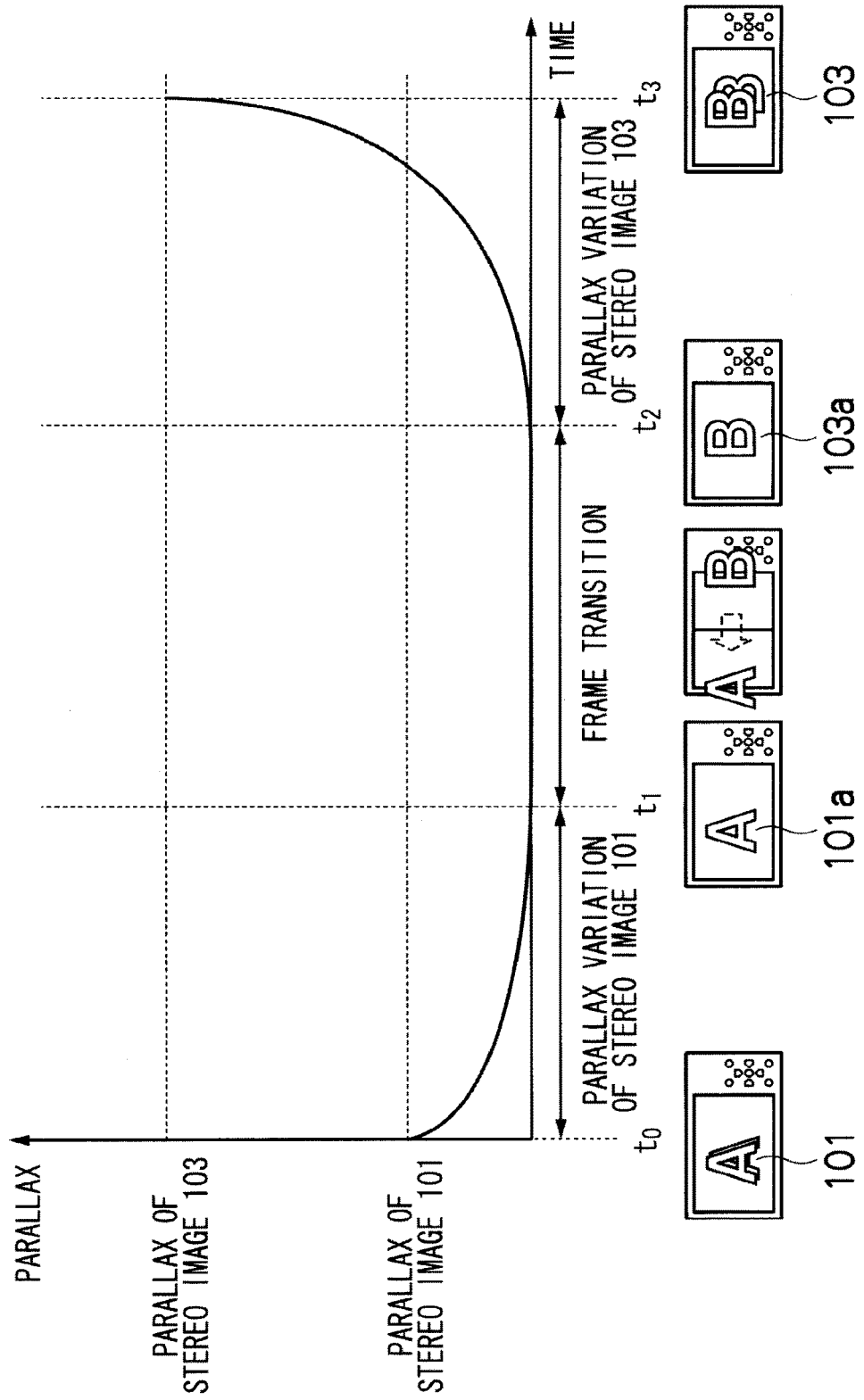

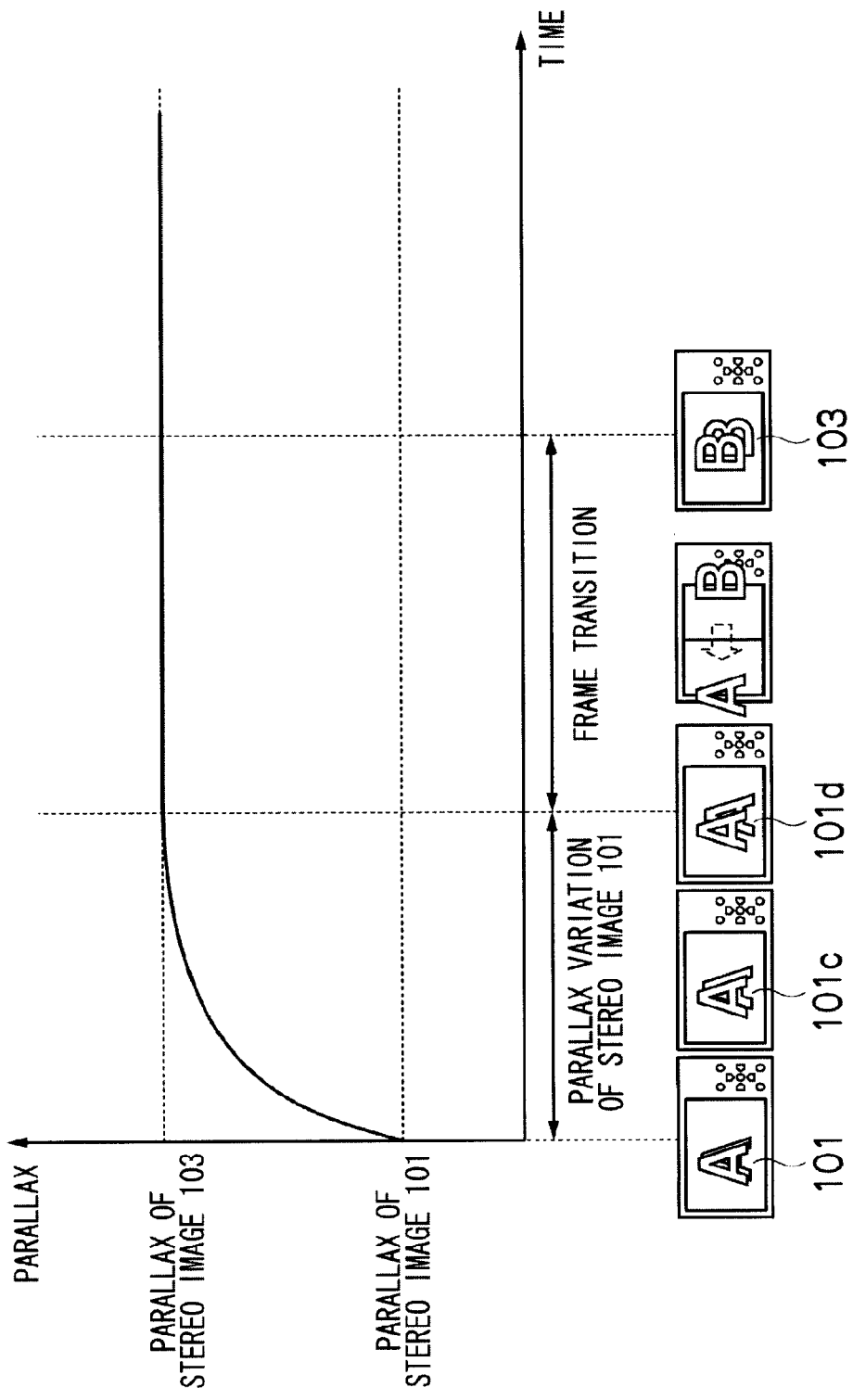

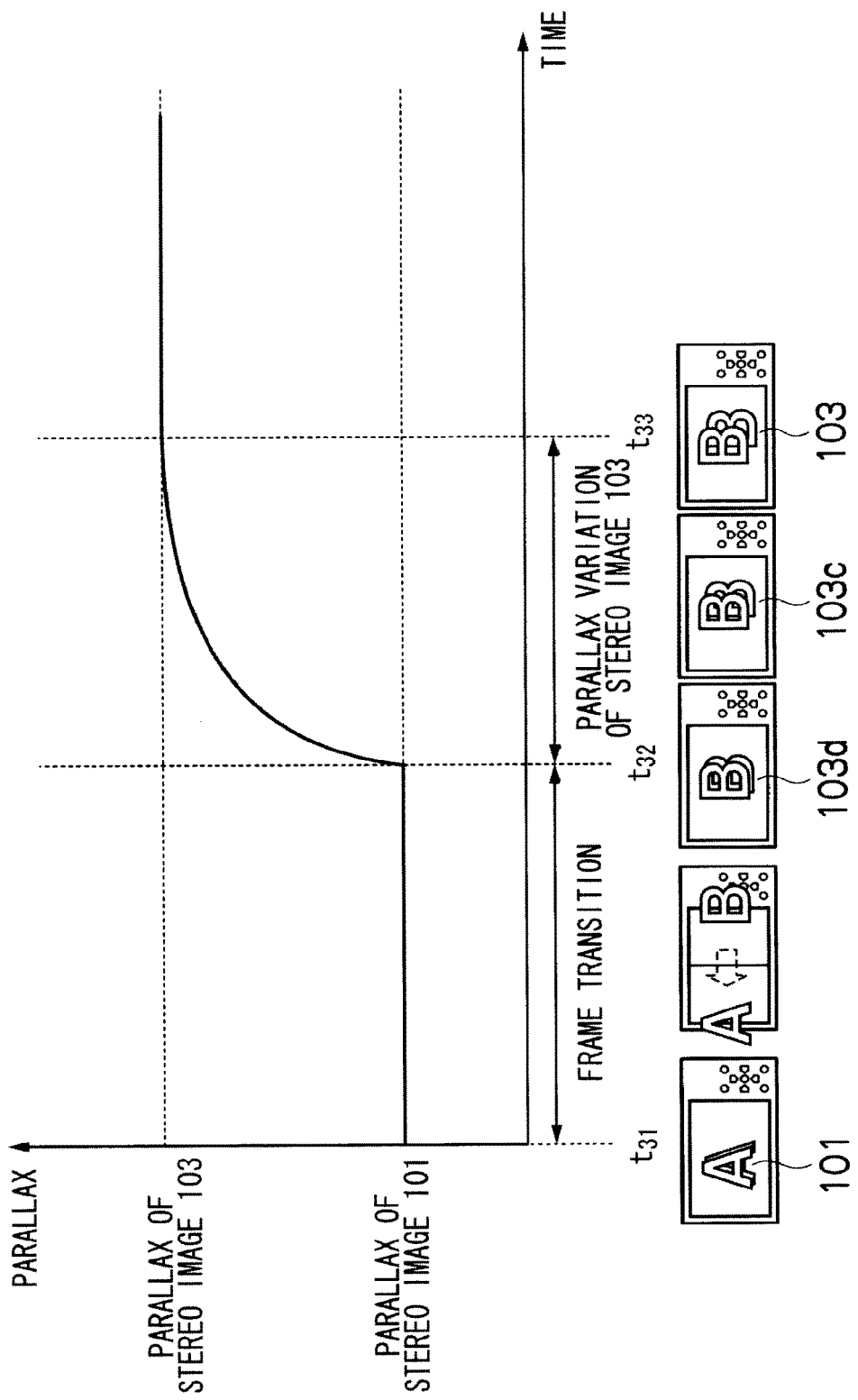

STEREO IMAGE DISPLAY APPARATUS AND STEREO IMAGE DISPLAY METHOD

This application is a continuation of U.S. application Ser. No. 13/224,625, filed Sep. 2, 2011, which claims priority to JP 2011-150254 and JP 2011-150255, both filed Jul. 6, 2011, each of which is incorporated herein by reference in its entirety.

BACKGROUND OF THE INVENTION

Field of the Invention

The present invention relates to a stereo image display apparatus and display method, and in particular to a stereo image display apparatus and a stereo image display method that reduce fatigue and discomfort a user feels when a display transitions from a state of displaying a stereo image having a predetermined parallax to that of displaying a stereo image having a different parallax.

Description of the Related Art

There is known a stereo image display apparatus that allows a user to stereoscopically view an image having a binocular parallax by inputting the image separately to the right and left eyes of the user. Viewing stereoscopically with such a stereo image display apparatus may cause the user's eye fatigue.

Japanese Patent Application Laid-Open No. 2008-306739 describes a technique for reducing a parallax of a stereo image when the display duration of the stereo image exceeds a predetermined duration. According to the technique, a parallax of a displayed stereo image is adjusted depending on fatigue of the viewer's eyes so that the viewer's eyes can be protected.

Even with the technique in Japanese Patent Application Laid-Open No. 2008-306739, however, a problem has been that when stereo images are advanced frame by frame, the display abruptly transitions to an image having a different parallax, which forces the user to immediately adjust the parallax in response to the transition, causing discomfort, fatigue, and loss of the stereoscopic effect accordingly. The problem is exacerbated when the frame-by-frame advance is faster.

The present invention has been made in view of such circumstances, and it is an object of the invention to provide a stereo image display apparatus and a stereo image display method that reduce fatigue and discomfort a user feels when a display transitions from a state of displaying a stereo image having a predetermined parallax to that of displaying a stereo image having a different parallax.

SUMMARY OF THE INVENTION

To attain the object, a stereo image display apparatus according to the invention is a stereo image display apparatus that causes a display device to display a stereo image having a parallax, wherein a stereo image of the currently displayed frame is advanced frame by frame to a stereo image of the next frame in response to a frame-by-frame advance indication, the apparatus comprising a frame-by-frame advancing device that, once frame-by-frame advance is indicated, switches the stereo image of the current frame on the display with a parallaxless image of the current frame, thereafter advances the image frame by frame to display a parallaxless image of the next frame, and further thereafter displays a stereo image of the next frame on the display device, wherein the frame-by-frame advancing device performs the frame-by-frame advance with sliding-out/sliding-in.

According to the invention, once frame-by-frame advance is indicated, a stereo image of the next frame is displayed on the display device after a parallaxless image is displayed. Therefore, it is possible to reduce fatigue and discomfort a user feels when a display transitions from a state of displaying a stereo image having a predetermined parallax to that of displaying a stereo image having a different parallax.

Preferably, the stereo image display apparatus further comprises a stereo image processing device that generates the parallaxless image from a stereo image having a predetermined parallax, the stereo image processing device generates the parallaxless image of the next frame while the stereo image of the current frame is displayed.

Preferably, the stereo image processing device generates the parallaxless image of the current frame while the stereo image of the current frame is displayed.

The frame-by-frame advancing device may display a stereo image having a reduced parallax of the current frame between displays of the stereo image of the current frame and of the parallaxless image of the current frame and display a stereo image having a reduced parallax of the next frame between displays of the parallaxless image of the next frame and of the stereo image of the next frame.

In this way, it is possible to reduce fatigue and discomfort a user feels, and provide natural frame-by-frame advance.

The frame-by-frame advancing device may display a plurality of stereo images having a reduced parallax of the current frame in descending order of parallax between displays of the stereo image of the current frame and of the parallaxless image of the current frame and display a plurality of stereo images having a reduced parallax of the next frame in ascending order of parallax between displays of the parallaxless image of the next frame and of the stereo image of the next frame.

In this way, it is possible to reduce fatigue and discomfort a user feels, and provide natural frame-by-frame advance.

Preferably, the stereo image display apparatus further comprises a fast frame-by-frame advancing device that performs frame-by-frame advance in a shorter time than frame-by-frame advance performed by the frame-by-frame advancing device, the fast frame-by-frame advancing device using only parallaxless images without any stereo image displayed to perform frame-by-frame advance with sliding-out/sliding-in once frame-by-frame advance is indicated, a determination device that determines whether the frame-by-frame advance indication is directed to the frame-by-frame advancing device or to the fast frame-by-frame advancing device, and a control device that controls the frame-by-frame advancing device and the fast frame-by-frame advancing device based on the determination of the determination device.

In this way, it is possible to prevent the burden on the eyes caused by a fast changing parallax.

The stereo image display apparatus may indicate that an original image of the parallaxless image is a stereo image during frame-by-frame advance by the fast frame-by-frame advancing device.

In this way, it is possible to distinguish whether the displayed image is a stereo image or a flat image.

To attain the object, a stereo image display method according to the invention is a stereo image display method that causes a display device to display a stereo image having a parallax, wherein a stereo image of the currently displayed frame is advanced frame by frame to a stereo image of the next frame in response to a frame-by-frame advance indication, the method comprising: once frame-by-frame advance is indicated, switching the stereo image of the current frame on the display with a parallaxless image of the current frame; thereafter advancing the image frame by frame with sliding-out/sliding-in to display a parallaxless image of the next frame; and further thereafter displaying a stereo image of the next frame on the display device.

To attain the object, a stereo image display apparatus according to the invention is a stereo image display apparatus that causes a display device to display a stereo image having a parallax, wherein a stereo image of the currently displayed frame is sequentially advanced frame by frame to a stereo image of the next frame every predetermined time by a slide show, the stereo image display apparatus being adapted to, in the frame-by-frame advance, switch the stereo image of the current frame on the display with a parallaxless image of the current frame, thereafter advance the image frame by frame to display a parallaxless image of the next frame, and further thereafter display a stereo image of the next frame on the display device, and further adapted to perform the frame-by-frame advance with one of sliding-out/sliding-in and fading-out/fading-in.

According to the invention, once frame-by-frame advance is indicated, a stereo image of the next frame is displayed on the display device after a parallaxless image is displayed. Therefore, it is possible to reduce fatigue and discomfort a user feels when a display transitions from a state of displaying a stereo image having a predetermined parallax to that of displaying a stereo image having a different parallax.

Preferably, the stereo image display apparatus further comprises a stereo image processing device that generates the parallaxless image from a stereo image having a predetermined parallax, the stereo image processing device creates the parallaxless image of the next frame while the stereo image of the current frame is displayed.

Preferably, the stereo image processing device creates the parallaxless image of the current frame while the stereo image of the current frame is displayed.

A stereo image having a reduced parallax of the current frame may be displayed between displays of the stereo image of the current frame and of the parallaxless image of the current frame and a stereo image having a reduced parallax of the next frame may be displayed between displays of the parallaxless image of the next frame and of the stereo image of the next frame.

In this way, it is possible to reduce fatigue and discomfort a user feels, and provide natural frame-by-frame advance.

A plurality of stereo images having a reduced parallax of the current frame may be displayed in descending order of parallax between displays of the stereo image of the current frame and of the parallaxless image of the current frame and a plurality of stereo images having a reduced parallax of the next frame may be displayed in ascending order of parallax between displays of the parallaxless image of the next frame and of the stereo image of the next frame.

In this way, it is possible to reduce fatigue and discomfort a user feels, and provide natural frame-by-frame advance.

To attain the object, a stereo image display method according to the invention is a stereo image display method that causes a display device to display a stereo image having a parallax, wherein a stereo image of the currently displayed frame is sequentially advanced frame by frame to a stereo image of the next frame every predetermined time by a slide show, the method comprising in the frame-by-frame advance: switching the stereo image of the current frame on the display with a parallaxless image of the current frame; thereafter advancing the image frame by frame with sliding-out/sliding-in or fading-out/fading-in to display a parallaxless image of the next frame; and further thereafter displaying a stereo image of the next frame on the display device.

According to the invention, once frame-by-frame advance is indicated, a stereo image of the next frame is displayed on the display device after a parallaxless image is displayed. Therefore, it is possible to reduce fatigue and discomfort a user feels when a display transitions from a state of displaying a stereo image having a predetermined parallax to that of displaying a stereo image having a different parallax.

BRIEF DESCRIPTION OF THE DRAWINGS

FIG. 6 is a graphical representation of changes in parallaxes of stereo images 101 and 103;

FIG. 13 is a graphical representation of changes in parallaxes of stereo images 101 and 103; and FIG. 14 is a graphical representation of changes in parallaxes of stereo images 101 and 103.

DETAILED DESCRIPTION OF THE PREFERRED EMBODIMENTS

The best modes for implementing the present invention will now be described.

First Embodiment

Figure 1:
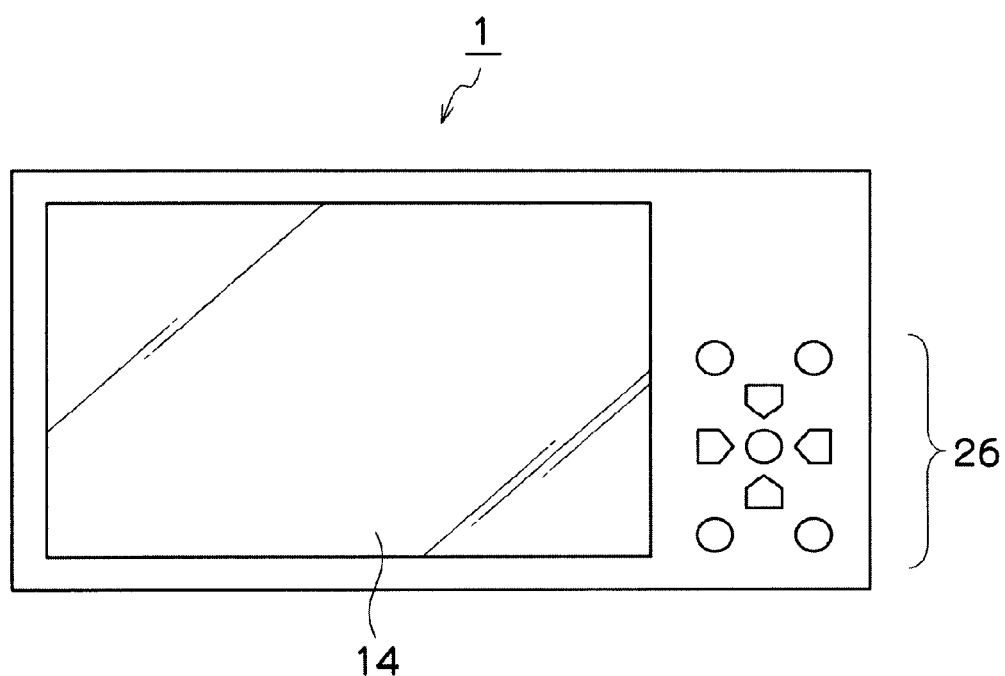
FIG. 1 is a front view of a stereo image display apparatus 1 according to the invention.

FIG. 1 is a front view of a stereo image display apparatus 1 according to the invention. As shown, the housing of the stereo image display apparatus 1 is formed in a substantially rectangular box shape, and is provided with a stereo image display device 14 and a control section 26 in the front thereof.

Although not shown in detail, the control section 26 is provided with a record/play mode selection switch 26a, a record button 26c, a power button 26d, a zoom button 26e, a menu button 26f, a menu selection cross key 26g, and the like, with which a user controls the stereo image display apparatus 1 as required to perform the respective operations.

The stereo image display device 14 is a 3D monitor of a lenticular lens type capable of stereoscopically displaying stereo image data. The stereo image display device 14 displays a screen for GUI that displays a variety of menu screens for use in setting an operational mode, a zoom, and the like, and where settings can be made in response to operations on the control section 26.

Figure 2:
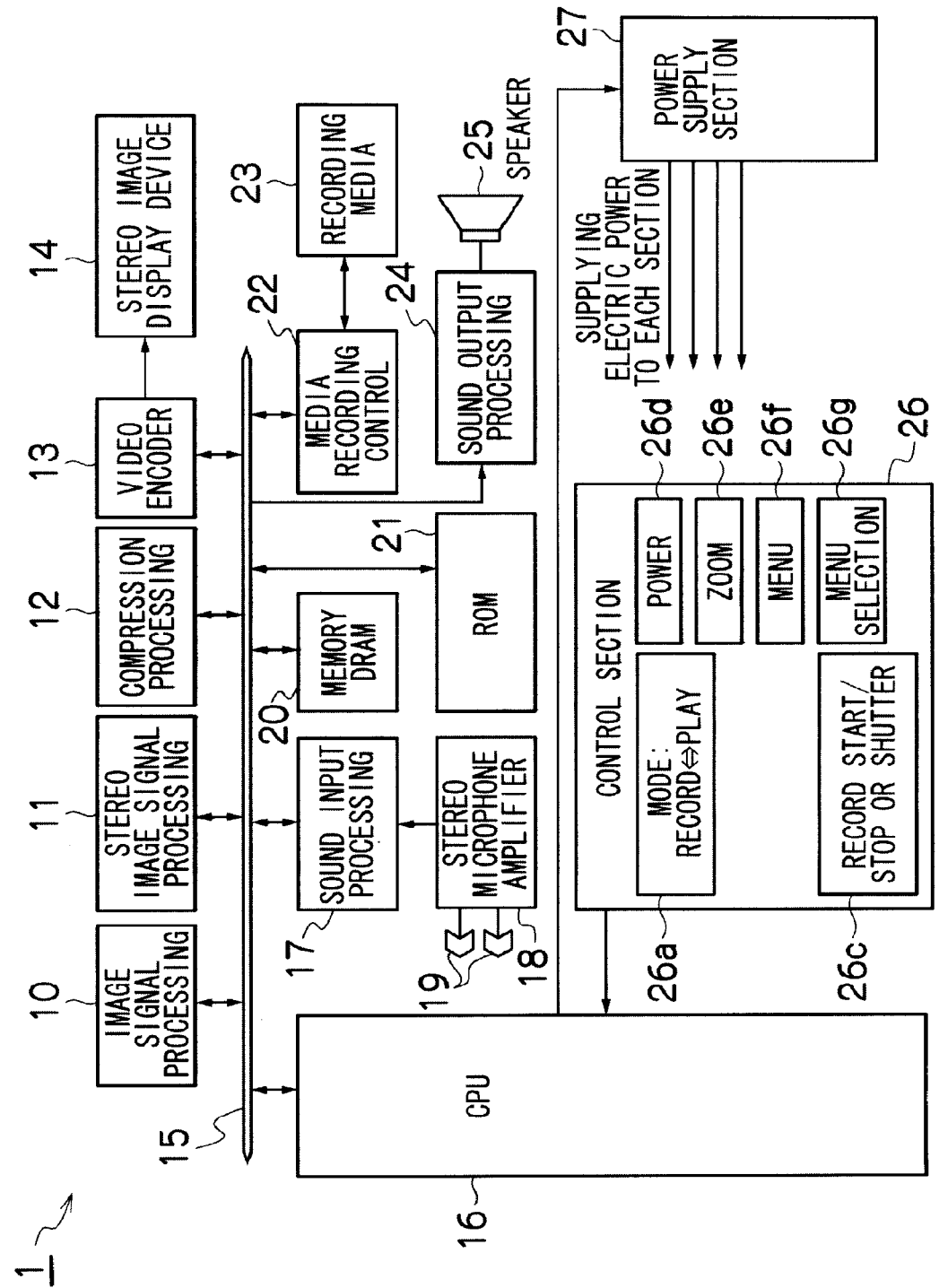
FIG. 2 is a diagram showing an example of an electrical configuration of the stereo image display apparatus 1.

FIG. 2 is a diagram showing an example of an electrical configuration of the stereo image display apparatus 1. As shown, in addition to the stereo image display device 14 and the control section 26, the stereo image display apparatus 1 is composed of an image signal processing section 10, a stereo image signal processing section 11, a compression processing section 12, a video encoder 13, a bus 15, a CPU 16, a sound input processing section 17, a stereo microphone amplifier section 18, a microphone 19, a memory 20, a ROM 21, a media recording controlling section 22, recording media 23, and the like.

Each of the sections is controlled by the CPU 16 for operation, and the CPU 16 executes predetermined control programs based on inputs from the control section 26 to control the respective sections of the stereo image display apparatus 1.

In the ROM 21, a variety of data and the like required for control are stored as well as the control programs executed by the CPU 16. The CPU 16 loads the control programs stored in the ROM 21 into the memory 20, and executes the programs sequentially to control the respective sections of the stereo image display apparatus 1.

Commanded by the CPU 16, the video encoder 13 controls image data input through the bus 15 to display the data on the stereo image display device 14.

The stereo microphone amplifier section 18 amplifies a sound signal input from the microphone 19 and inputs the signal to the sound input processing section 17. Commanded by the CPU 16, the sound input processing section 17 converts the sound signal input from the stereo microphone amplifier section 18 into a digital signal in a predetermined format.

The recording media 23 is removable recording media such as a semiconductor memory card, a portable miniature hard disk, a magnetic disk, an optical disk, or a magneto-optical disk. The media recording controlling section 22 receives both image data compressed by the compression processing section 12 and sound data converted into the digital signal in the sound input processing section 17 through the bus 15, and the media recording controlling section 22 records these signals in the recording media 23.

A sound output device 24 causes a speaker 25 to make a sound based on the sound signal input through the bus 15.

A power supply section 27 generates various DC voltages from an AC power supply, which is not shown, and supplies electric power to each section of the stereo image display apparatus 1. Instead of the AC power supply, the various DC voltages may be generated from a battery mounted in the stereo image display apparatus 1.

Figure 3A:
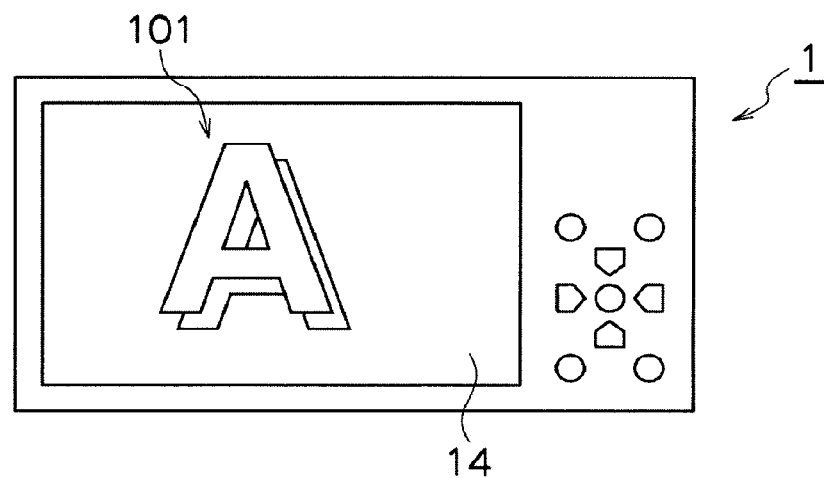
FIGS. 3A to 3C are views showing frame-by-frame advance of stereo images displayed on a stereo image display device 14.

The frame-by-frame advance of stereo images in the stereo image display apparatus 1 will now be described. FIG. 3A is a view showing a stereo image 101 having a predetermined parallax displayed on the stereo image display device 14. The stereo image 101 is an image stored in the recording media 23. In this state, a user can stereoscopically view the stereo image 101.

Here, in response to the user operating the control section 26, the stereo image display apparatus 1 can advance the currently displayed stereo image 101 to an image to be displayed next, i.e. a stereo image 103 having a predetermined parallax, frame by frame. The apparatus is configured to allow the user to specify the order of images displayed at will in advance; possible order of images is, for example, the order of date in which the images are taken.

It is to be noted that "frame-by-frame advance" as used herein includes not only sequentially displaying images in predetermined order but also switching the current frame while it is displayed with any frame specified by the user, and the apparatus may be configured to perform frame-by-frame advance in this manner.

Figure 3B:
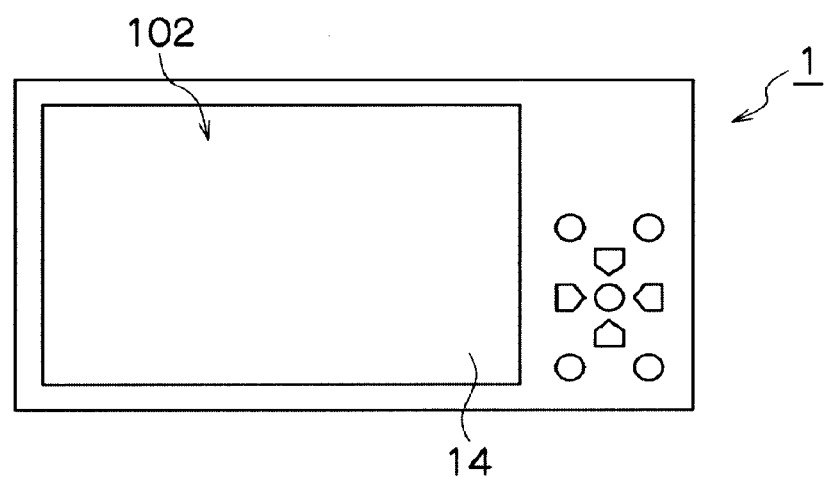

When the control section 26 is operated to indicate that the stereo images should be advanced frame by frame, the CPU 16 switches the stereo image 101 currently displayed on the stereo image display device 14 with a parallaxless image 102 via the video encoder 13. The parallaxless image 102 is previously stored in the ROM 21. FIG. 3B is a view showing the parallaxless image 102 displayed on the stereo image display device 14. Although an entirely white image is used here as the parallaxless image 102, any type of image may be used. While the parallaxless image 102 is displayed, the user can see the image to refresh the user's eyes adapted to the parallax of the stereo image 101 with a parallaxless state.

Figure 3C:
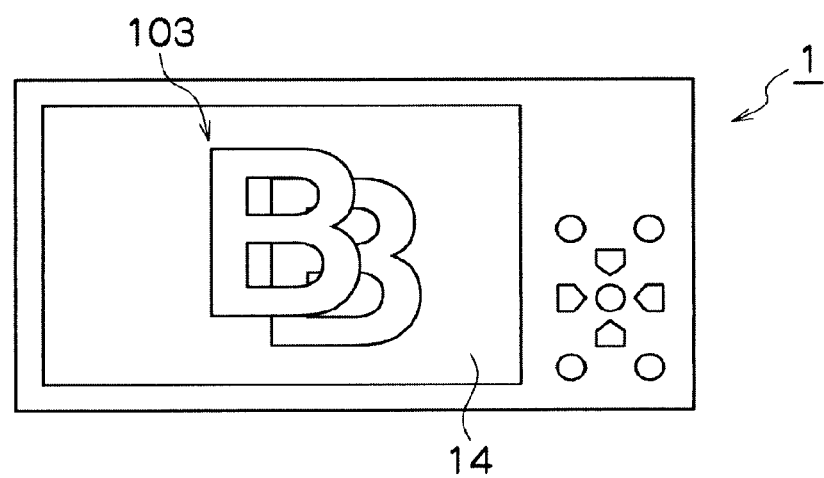

The CPU 16 reads a stereo image 103 to be displayed next from the recording media 23 via the media recording controlling section 22, and switches the parallaxless image 102 displayed on the stereo image display device 14 with the stereo image 103 to be displayed next when a predetermined time has expired since the beginning of display of the parallaxless image 102. FIG. 3C is a view showing a stereo image 103 having a predetermined parallax displayed on the stereo image display device 14. In this state, the user can stereoscopically view the stereo image 103.

In this way, when a display transitions from a state of displaying the stereo image 101 having a predetermined parallax to that of displaying the stereo image 103 having a different parallax, interposing the parallaxless image 102 once between the images allows the user to change the user's vision from the parallax of the stereo image 101 to a flat state without any parallax for a while, and fatigue of the user's eyes caused by stereoscopy can thereby be reduced.

In the embodiment, stereo images are advanced frame by frame by the user operating the control section 26. However, the present invention may be applied to a slide show, in which frame-by-frame advance is performed every predetermined time. The apparatus may alternatively be configured to allow the user to choose whether the parallaxless image 102 should be displayed at the time of frame-by-frame advance.

Alternatively, the parallaxless image displayed during frame-by-frame advance may be a parallaxless version of an image to be viewed stereoscopically.

Figure 4A:
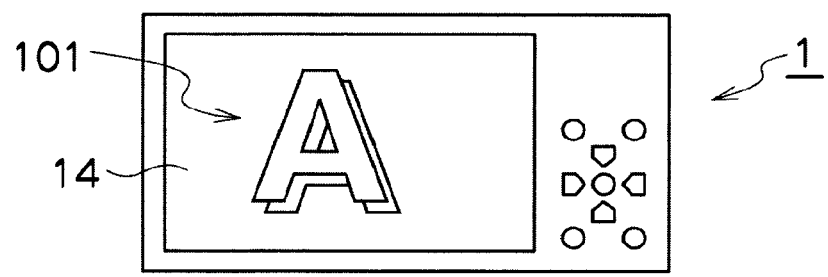
FIGS. 4A to 4E are views showing frame-by-frame advance of stereo images displayed on a stereo image display device 14.
Figure 4B:
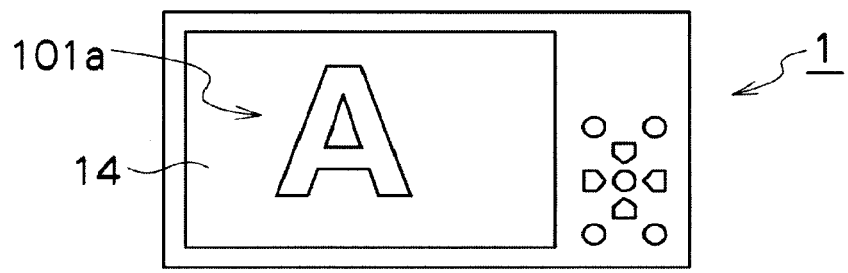

For example, when the user commands frame-by-frame advance while a stereo image 101 is displayed on the stereo image display device 14 as shown in FIG. 4A, the currently displayed stereo image 101 may be switched with a parallax-removed version of the stereo image 101, i.e. an image 101a, as shown in FIG. 4B. The image 101a, which is a parallax-removed version of the stereo image 101, is generated while the stereo image 101 is displayed based on both a left-eye image and a right-eye image of the stereo image 101.

Figure 4C:
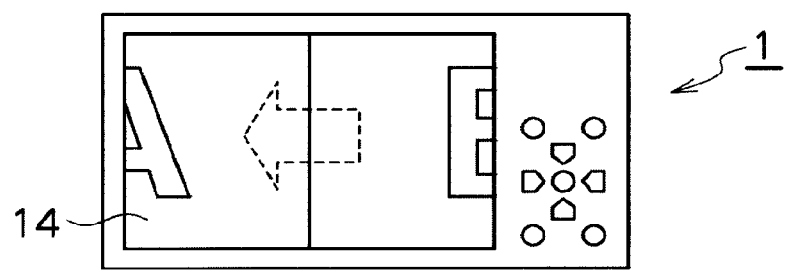
Figure 4D:
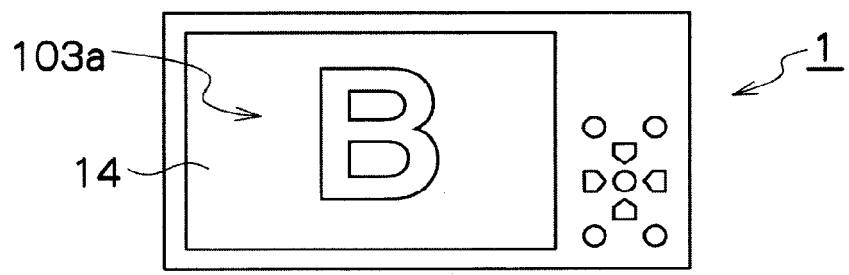

Next, the stereo image display apparatus 1 switches the parallax-removed image 101a with a parallax-removed image 103a as shown in FIGS. 4C and 4D. The parallax-removed image 103a is a parallax-removed version of the stereo image 103 to be displayed next, and similarly to the parallax-removed image 101a, it is generated while the stereo image 101 is displayed based on both a left-eye image and a right-eye image of the stereo image 103. In the figures, although switching of the image 101a with the image 103a is accomplished by using sliding-out/sliding-in, any other features such as fading-out/fading-in, overwrapping, and wiping may be used.

Figure 4E:
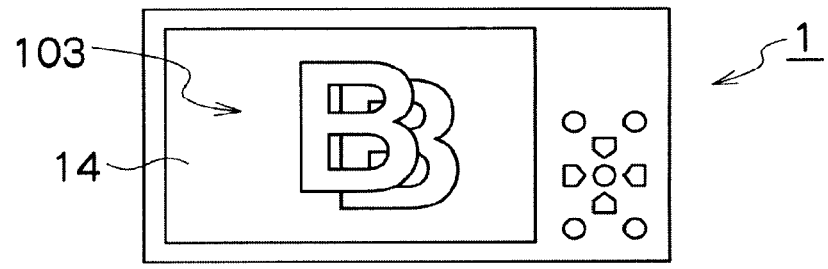

After the parallax-removed image 103a is displayed, the image is switched with the stereo image 103 to be displayed next as shown in FIG. 4E. In this state, the user can stereoscopically view the stereo image 103.

The duration required for frame-by-frame advance is preferably 0.3 sec for the display duration of the parallax-removed image 101a as shown in FIG. 4B, 0.4 sec for frame transition as shown in FIG. 4C, and 0.3 sec for the display duration of the parallax-removed image 103a as shown in FIG. 4B, and the total required duration for advancing one frame is preferably approximately 1 sec. With frame-by-frame advance performed in this manner, fatigue of the user's eyes caused by stereoscopy can be reduced and it is possible to provide a smooth frame-by-frame advance function. It is to be noted that the duration required for frame-by-frame advance is not limited to the above example, and may be determined as required. The duration may vary depending on a parallax, or the apparatus may be configured to allow the user to set at will.

Alternatively, instead of the parallaxless version of the image to be viewed stereoscopically, the image displayed during frame-by-frame advance may be an image having a parallax reduced from the parallax of the image to be viewed stereoscopically to the extent that the burden on the user's eyes can be prevented. For example, a parallax-reduced version of the stereo image 101 is generated while the stereo image 101 is displayed based on both a left-eye image and a right-eye image of the stereo image 101. When the user commands frame-by-frame advance, the currently displayed stereo image 101 is switched with the parallax-reduced version of the stereo image 101.

Similarly, a parallax-reduced version of the stereo image 103 is generated in advance, and the parallax-reduced version of the stereo image 101 is switched with the parallax-reduced version of the stereo image 103.

In this way, instead of an image whose parallax is completely removed, an image having a parallax reduced to the extent that the burden on the user's eyes can be prevented may be used for frame-by-frame advance so that fatigue of the user's eyes caused by stereoscopy can be reduced and it is possible to provide a smooth frame-by-frame advance function.

Furthermore, images advanced frame by frame may be displayed in such a way that parallaxes vary gradually.

Figure 5A:
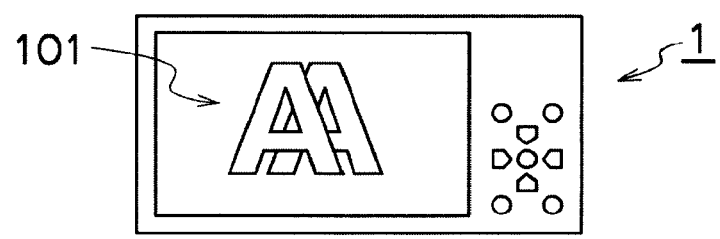
FIGS. 5A to 5G are views showing frame-by-frame advance of stereo images displayed on a stereo image display device 14.
Figure 5B:
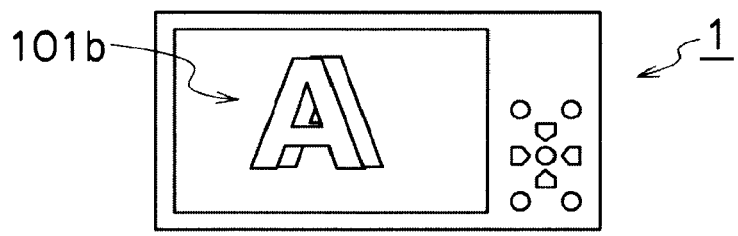
Figure 5C:
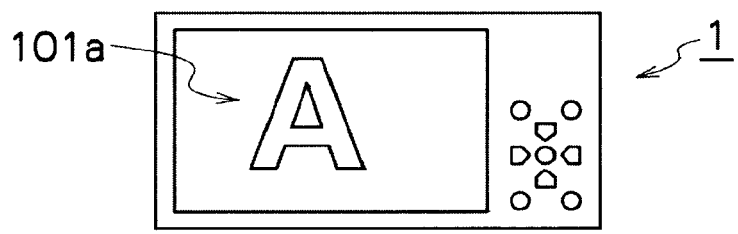

For example, when the user commands frame-by-frame advance while a stereo image 101 is displayed as shown in FIG. 5A, a plurality of stereo images 101b whose parallaxes are gradually reduced from the stereo image 101 are displayed as shown in FIG. 5B before the parallax-removed image 101a as shown in FIG. 5C is displayed. The plurality of stereo images 101b whose parallaxes are gradually reduced from the stereo image 101 are generated in the stereo image signal processing section 11, which extracts matching points based on a left-eye image and a right-eye image of the stereo image 101 and generates the images 101b each having a slightly different parallax until the parallax of the stereo image 101 is cancelled out. In addition, displaying a number of these stereo images 101b having different parallaxes sequentially for a small time period causes the display to appear to be gradually reducing in parallax as a movie.

Description will now be made to the changes in parallaxes in this case with reference to FIG. 6. FIG. 6 is a graphical representation of changes in parallaxes of stereo images 101 and 103, in which the axis of abscissas represents time and the axis of ordinates represents a parallax of a displayed image. As shown, once frame-by-frame advance is indicated, the stereo image 101 having a predetermined parallax to the parallax-removed image 101a are displayed from time t0 to time t1 such that the parallaxes vary gradually. In the figure, although the parallaxes vary exponentially, the images may be displayed such that the parallaxes vary linearly. The duration from time t0 to time t1 is preferably on the order of 0.3 sec.

Figure 5D:
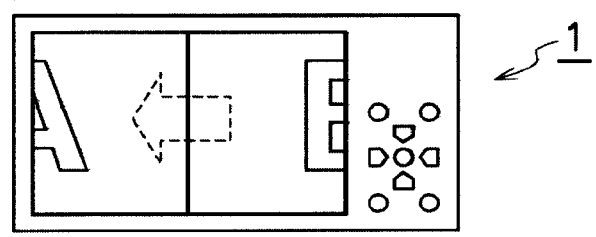

Thereafter, similarly to the case of FIGS. 4A to 4E, the parallax-removed image 101a is switched with the parallax-removed image 103a as shown in FIG. 5D. This duration corresponds to the duration from time t1 to time t2 in FIG. 6. As described above, the duration is preferably on the order of 0.4 sec.

Figure 5E:
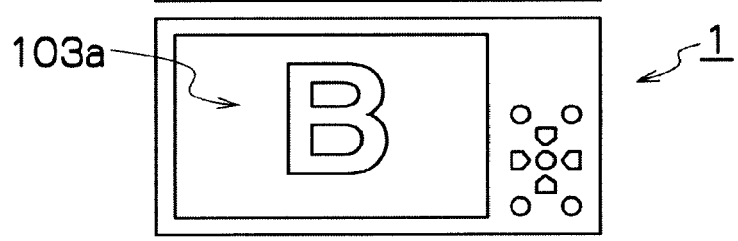
Figure 5F:
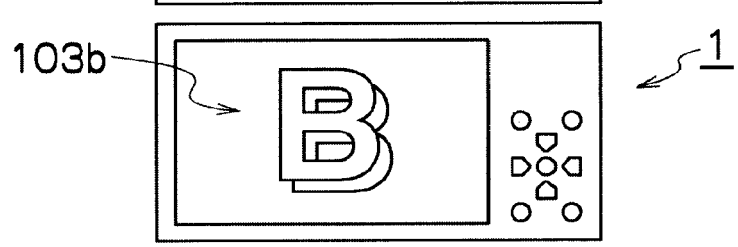
Figure 5G:
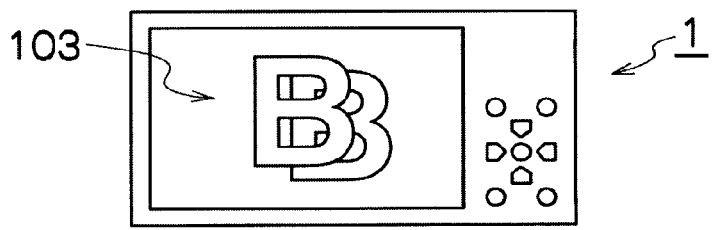

Furthermore, before the stereo image 103 as shown in FIG. 5G is displayed after the parallax-removed image 103a as shown in FIG. 5E, a plurality of stereo images 103b whose parallaxes are gradually increased are displayed as shown in FIG. 5F. The plurality of stereo images 103b whose parallaxes are gradually increased are also generated in the stereo image signal processing section 11, which changes the parallax of the stereo image 103 based on a left-eye image and a right-eye image of the stereo image 103. In addition, displaying the plurality of stereo images in ascending order of parallax causes the display to appear to be gradually increasing in parallax. Thereafter, the stereo image 103 is displayed. In this state, the user can stereoscopically view the stereo image 103.

In this case as shown in FIG. 6, although the parallaxes also vary exponentially, the images may be displayed such that the parallaxes vary linearly. Similarly, the duration from time t2 to time t3 is preferably on the order of 0.3 sec.

In this way, when frame-by-frame advance is indicated while the stereo image is displayed, the parallax of the displayed stereo image is reduced until the parallax is cancelled out, and the next frame takes over once the parallax is cancelled out. When the next frame is a stereo image, a parallax-removed version of the next frame is displayed, and the parallax is increased until the parallax is restored to the original parallax. Performing frame-by-frame advance in this manner allows the user to change without any discomfort the user's vision to a flat state without any parallax, and fatigue of the eyes caused by stereoscopy can thereby be reduced.

In cases where a parallax-reduced version of the stereo image 101 is used in place of the parallax-removed image 101a as shown in FIG. 5C, parallaxes of the plurality of stereo images 101b which are gradually reduced as shown in FIG. 5B may vary from that of the stereo images 101 to that of a parallax-reduced image. Similarly, in cases where a parallax-reduced version of the stereo image 103 is used in place of the parallax-removed image 103a as shown in FIG. 5E, parallaxes of the plurality of stereo images 103b which are gradually increased as shown in FIG. 5F may vary from that of a parallax-reduced image to that of the stereo images 103.

With frame-by-frame advance performed in this manner, fatigue of the user's eyes caused by stereoscopy can also be reduced.

Second Embodiment

Figure 7:
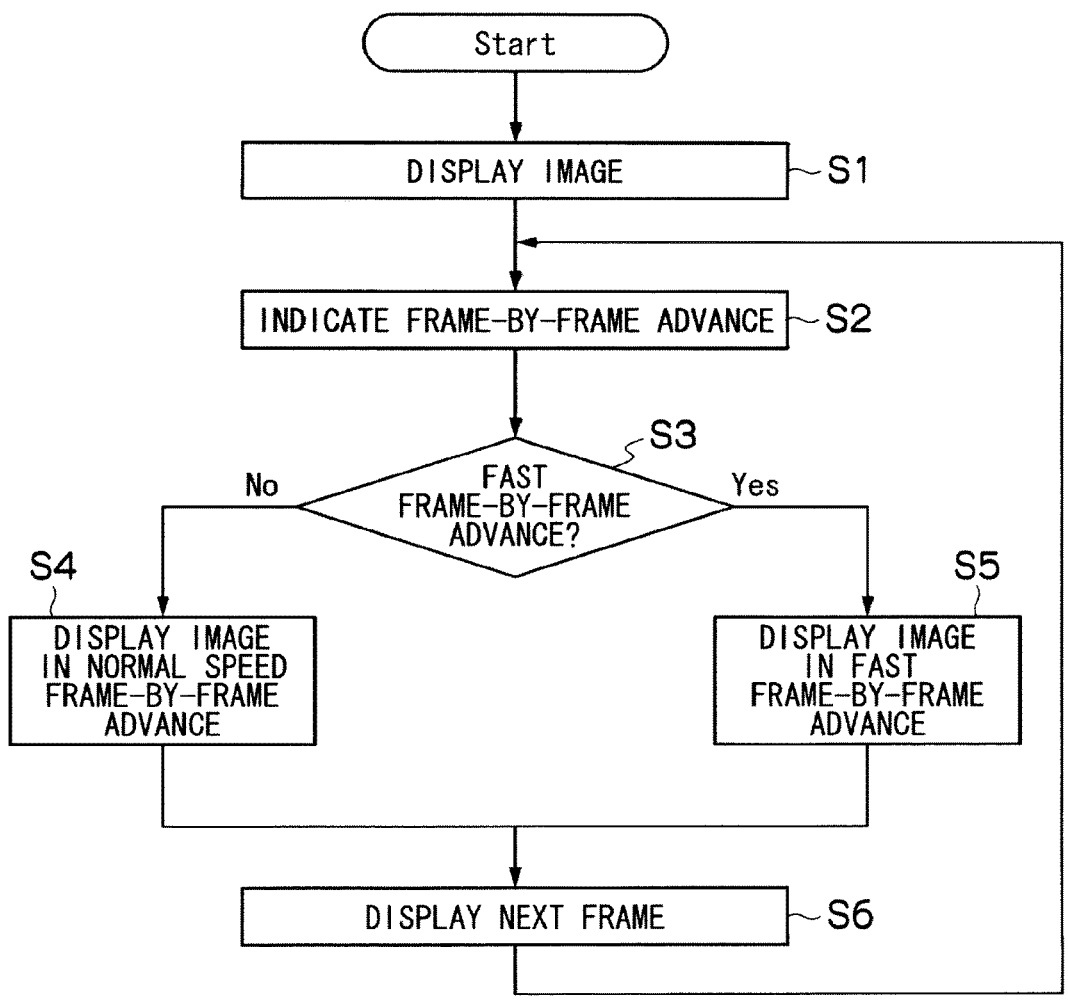
FIG. 7 is a flow chart of frame-by-frame advance of a second embodiment.

FIG. 7 is a flow chart of frame-by-frame advance of a second embodiment. In the second embodiment, a stereo image display apparatus 1 is provided with two types of frame-by-frame advance functions: normal speed frame-by-frame advance and fast frame-by-frame advance. In the normal speed frame-by-frame advance, images are advanced frame by frame to the next frame in response to a user indication, and in the fast frame-by-frame advance, display duration per image is reduced and images are sequentially and continuously advanced frame by frame in order to advance a large number of images frame by frame in a short time. Here, it is assumed that, in the normal speed frame-by-frame advance, the required duration for advancing one frame is approximately 1 sec, and in the fast frame-by-frame advance, the required duration for advancing one frame is approximately 0.3 sec.

A different control member in a control section 26 may be assigned to each of the normal speed and fast frame-by-frame advance functions, or the same control member (a control button) may be used to, for example, enable the normal speed frame-by-frame advance when the button is on for a certain short time and enable the fast frame-by-frame advance when the button is on for a certain longer time.

Similarly to the first embodiment, when a user operates the control section 26 to indicate frame-by-frame advance (step S2) while a stereo image 101 having a predetermined parallax is displayed on a stereo image display device 14 (step S1), a CPU 16 determines whether or not the user indication is of fast frame-by-frame advance (step S3).

If the indication is not of fast frame-by-frame advance, normal speed frame-by-frame advance is performed (step S4). The normal speed frame-by-frame advance is the same type of frame-by-frame advance function as in FIGS. 5A to 5G of the first embodiment. In other words, with the stereo image 101 displayed, a plurality of stereo images 101b whose parallaxes are gradually reduced from the stereo image 101 are displayed, and then a parallax-removed image 101a is displayed. Thereafter, the image is switched with a parallax-removed version of a stereo image 103 to be displayed next, i.e. an image 103a, a plurality of stereo images 103b whose parallaxes are gradually increased are then displayed, and finally, the stereo image 103 to be displayed next is displayed (step S6). Here, it is assumed that the display duration of the plurality of stereo images 101b is 0.3 sec, switching of the parallax-removed image 101a with parallax-removed image 103a is 0.4 sec, and the display duration of the plurality of stereo images 103b is 0.3 sec, so that the total required duration for advancing one frame is preferably 1 sec.

Figure 8:
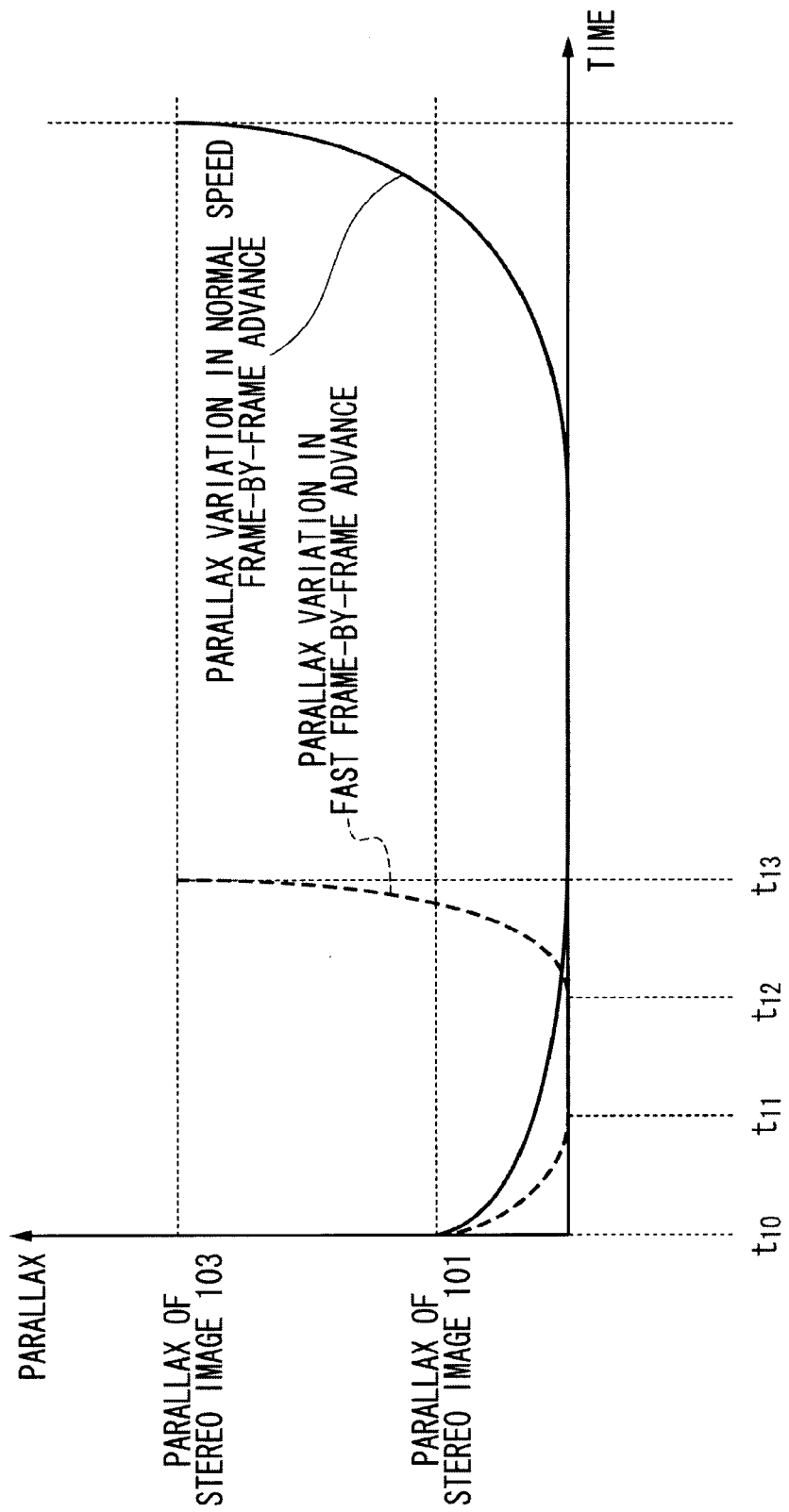
FIG. 8 is a graphical representation of changes in parallaxes during normal speed frame-by-frame advance and changes in parallaxes during fast frame-by-frame advance.

In step S3, if it is determined that the indication is of fast frame-by-frame advance, the fast frame-by-frame advance is performed. In fast frame-by-frame advance, although images to be displayed are the same as in FIGS. 5A to 5G of the first embodiment, the display duration of each image is different from the normal speed frame-by-frame advance. In FIG. 8, there is shown a graphical representation of changes in parallaxes during normal speed frame-by-frame advance and changes in parallaxes during fast frame-by-frame advance. A solid line represents changes in parallaxes during normal speed frame-by-frame advance, which are similar to parallaxes as shown in FIG. 6. A dotted line represents changes in parallaxes during fast frame-by-frame advance. Duration of time t10 to t11 represents the display duration of the plurality of stereo images 101b, duration of time t11 to t12 represents switching of the parallax-removed image 101a with the parallax-removed image 103a, and duration of time t12 to t13 represents the display duration of the plurality of stereo images 103b; 0.1 sec is assigned to any duration so that the total required duration for advancing one frame is preferably 0.3 sec.

In order to make the display duration of the plurality of stereo images 101b and the plurality of stereo images 103b shorter than those in the normal speed frame-by-frame advance, the number of the plurality of stereo images may be reduced to use the same display duration as that in the normal speed frame-by-frame advance, or the number of the plurality of stereo images may be kept the same as that in the normal speed frame-by-frame advance and the display duration per image may be reduced.

Displaying in this manner allows the user to change the user's vision to a flat state without any parallax while the indicated speed of frame-by-frame advance is achieved, and fatigue of the eyes caused by stereoscopy can thereby be reduced.

Third Embodiment

Figure 9:
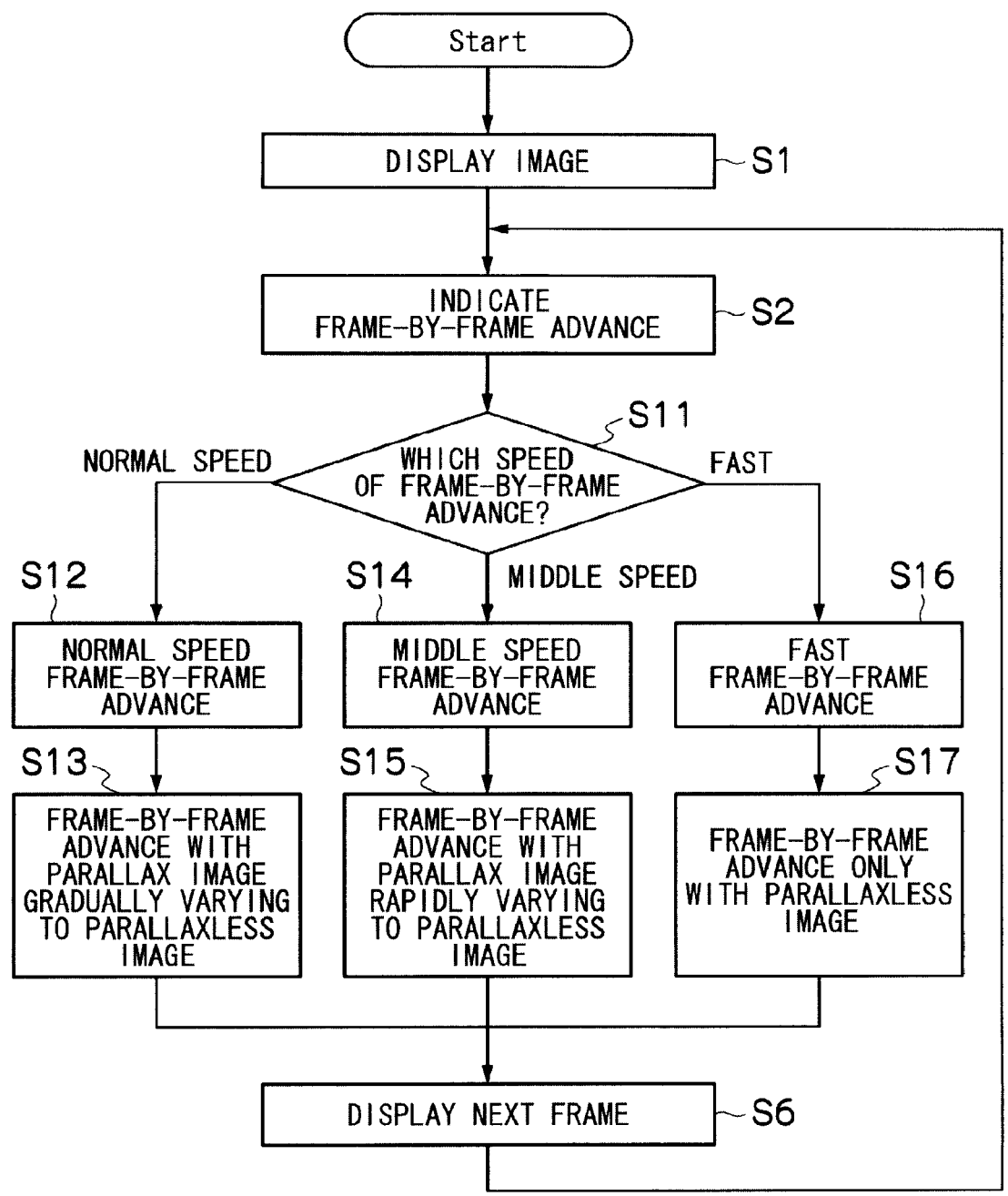
FIG. 9 is a flow chart of frame-by-frame advance of a third embodiment.

FIG. 9 is a flow chart of frame-by-frame advance of a third embodiment. In the third embodiment, a stereo image display apparatus 1 is provided with three types of frame-by-frame advance functions: normal speed frame-by-frame advance, middle speed frame-by-frame advance, and fast frame-by-frame advance. The normal speed frame-by-frame advance is similar to that in the second embodiment, and the middle speed frame-by-frame advance is similar to the fast frame-by-frame advance in the second embodiment. The fast frame-by-frame advance in the third embodiment is provided to advance a large number of images frame by frame in a shorter time than the middle speed frame-by-frame advance, and the required duration for advancing one frame is approximately 0.2 sec.

A different control member in a control section 26 may be assigned to each of these frame-by-frame advance functions, or the functions may be allocated to the same control member (a control button) depending on on-time thereof.

Similarly to the second embodiment, when a user operates the control section 26 to indicate frame-by-frame advance (step S2) while a stereo image 101 having a predetermined parallax is displayed on a stereo image display device 14 (step S1), a CPU 16 determines an indicated speed of frame-by-frame advance (step S11).

If the indicated speed of frame-by-frame advance is normal speed frame-by-frame advance (step S12), frame-by-frame advance is performed similarly to the normal speed frame-by-frame advance in the second embodiment. If the indicated speed of frame-by-frame advance is middle speed frame-by-frame advance (step S14), frame-by-frame advance is performed similarly to the fast frame-by-frame advance in the second embodiment (step S15). Description of these frame-by-frame advance functions will be omitted.

If the indicated speed of frame-by-frame advance is fast frame-by-frame advance (step S16), only a parallax-removed image 103a is used to perform frame-by-frame advance (step S17).

FIGS. 10A to 10E are views showing images displayed on a stereo image display device 14 and showing fast frame-by-frame advance of step S17. In the fast frame-by-frame advance, assuming that stereo images 101, 103 and 105 are advanced frame by frame in this order, only parallax-removed versions of these stereo images, i.e. image 101a, 103a and 105a, are displayed for frame-by-frame advance.

Figure 10A:
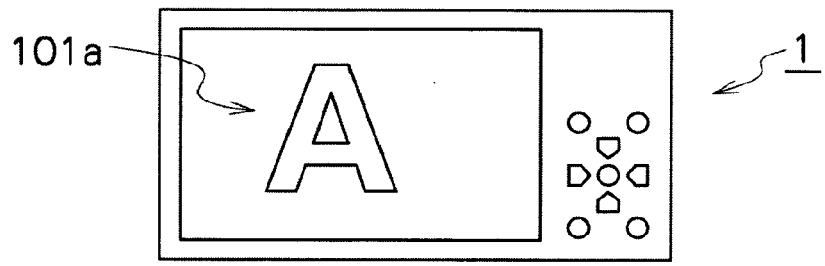
FIGS. 10A to 10E are views showing frame-by-frame advance of stereo images displayed on a stereo image display device 14.

When the user commands fast frame-by-frame advance while the stereo image 101 is displayed, a plurality of stereo images 101b whose parallaxes are gradually reduced from the stereo image 101 are displayed, and then the parallax-removed image 101a is displayed, in a similar way as described above. Such a state is shown in FIG. 10A. The display duration is set to 0.1 sec.

Figure 10B:
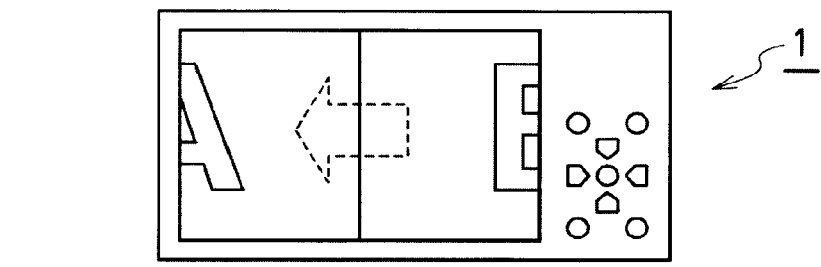

Next, as shown in FIG. 10B, the image 101a is switched with a parallax-removed version of the stereo image 103 to be displayed next, i.e. the image 103a, with sliding-out/sliding-in. The switching duration is also set to 0.1 sec. Similarly as described above, other effects for switching images may be used.

Figure 10C:
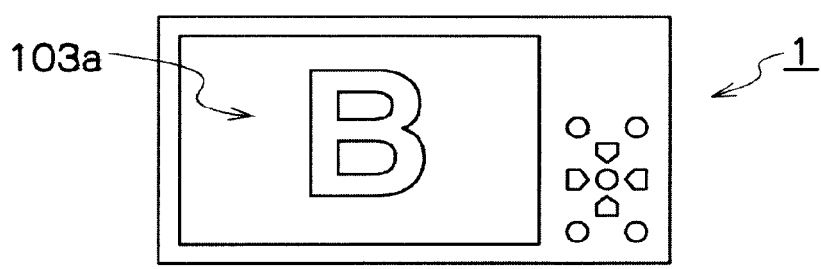

Furthermore, the image 103a is displayed as shown in FIG. 10C. The display duration is also set to 0.1 sec.

Figure 10D:
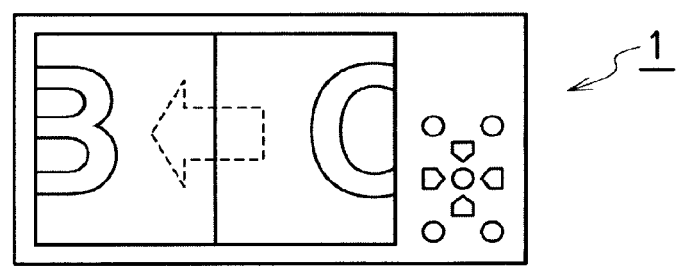
Figure 10E:
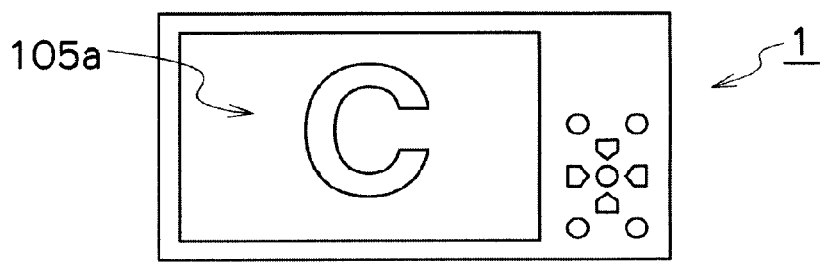
Figure 11A:
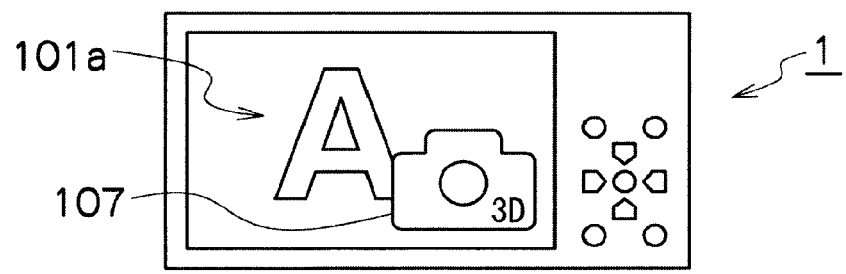
FIGS. 11A to 11E are views showing frame-by-frame advance of stereo images displayed on a stereo image display device 14.
Figure 11B:
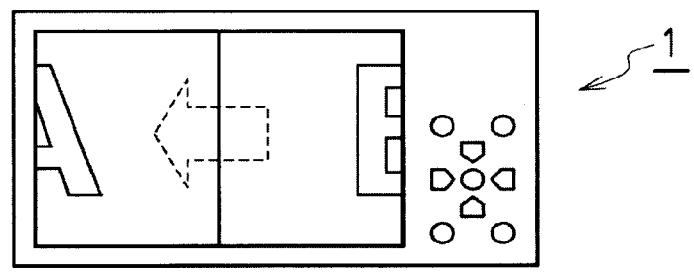
Figure 11C:
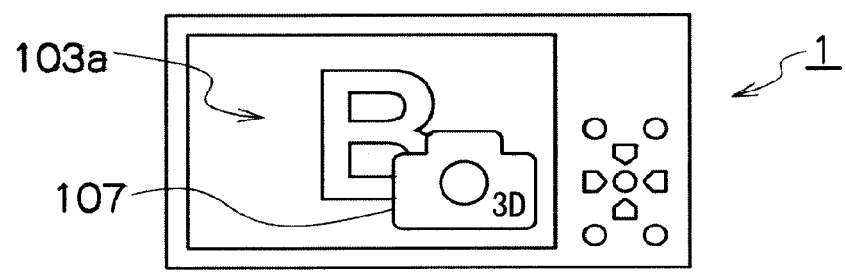
Figure 11D:
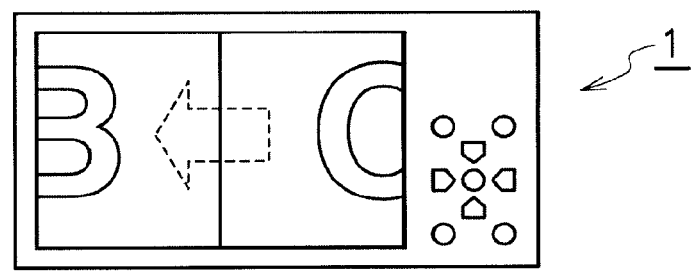
Figure 11E:
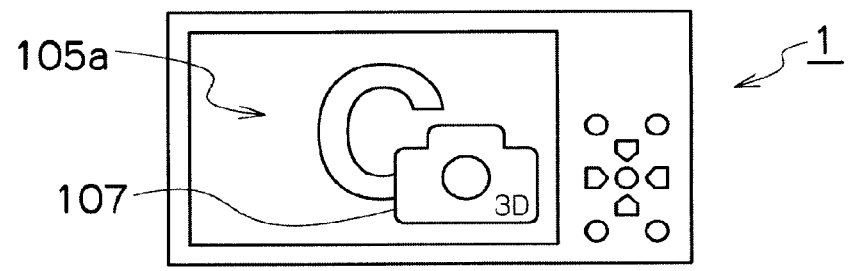

When the fast frame-by-frame advance is still indicated, as shown in FIG. 10D, the image 103a is switched with a parallax-removed version of the stereo image 105 to be displayed next, i.e. the image 105a, with sliding-out/sliding-in. Furthermore, the image 105a is displayed as shown in FIG. 10E.

When fast frame-by-frame advance is performed in this manner, the speed of frame-by-frame advance takes precedence and the images are not stereoscopically displayed during frame-by-frame advance because it is considered that the user is searching for an image that the user wants to stereoscopically view. In this way, it is possible to prevent the burden on the eyes caused by the user stereoscopically viewing images having fast changing parallaxes.

It is to be noted that, in fast frame-by-frame advance as shown in FIGS. 10A to 10E, the user cannot distinguish whether the image advanced frame by frame is originally a stereo image or a flat image in nature. As shown in FIGS. 11A to 11E, therefore, a stereo image icon 107 may be displayed along with a parallax-removed image in order for the user to notice that the displayed image is originally a stereo image. Since the stereo image icon 107 is simultaneously displayed, the user can notice that the displayed image is originally a stereo image even though the image displayed during fast frame-by-frame advance is not a stereo image.

Fourth Embodiment

In the first to third embodiments, although a parallaxless image is displayed once when a stereo image having a predetermined parallax is advanced frame by frame to a stereo image having a different parallax, the parallax of the currently displayed stereo image may be changed to a parallax of an image to be displayed next.

FIGS. 12A to 12E are views showing images displayed on a stereo image display device 14 when a stereo image 101 is advanced frame by frame to a stereo image 103.

Figure 12A:
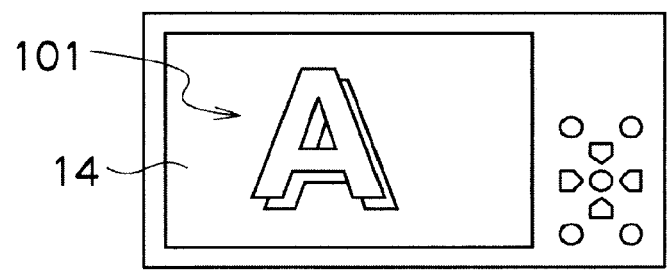
FIGS. 12A to 12E are views showing frame-by-frame advance of stereo images displayed on a stereo image display device 14.
Figure 12B:
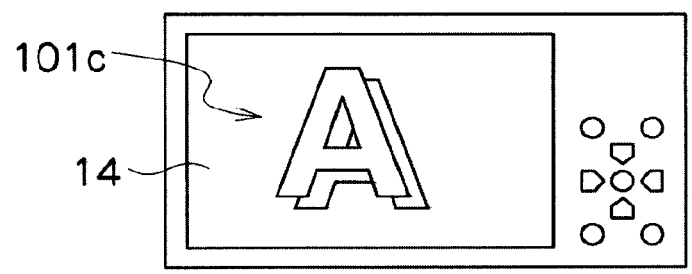

When the user commands frame-by-frame advance while a stereo image 101 is displayed on the stereo image display device 14 as shown in FIG. 12A, a plurality of stereo images 101c whose parallaxes are gradually brought close to the parallax of the stereo image 103 from the stereo image 101 are displayed as shown in FIG. 12B before the stereo image 103 to be displayed next is displayed. The CPU 16 acquires the parallax of the stereo image 103 to be displayed next in advance, and the plurality of stereo images 101c whose parallaxes are gradually brought close to the parallax of the stereo image 103 from the stereo image 101 are generated in the stereo image signal processing section 11, which extracts matching points based on a left-eye image and a right-eye image of the stereo image 101 and generates the images 101c each having a slightly different parallax from that of the stereo image 101 until the parallax of the stereo image 101 reaches that of the stereo image 103 to be displayed next. In addition, displaying a number of these stereo images 101c having different parallaxes sequentially for a small time period causes the display to appear to be gradually changing in parallax as a movie so as to be brought close to the parallax of the stereo image 103.

Figure 12C:
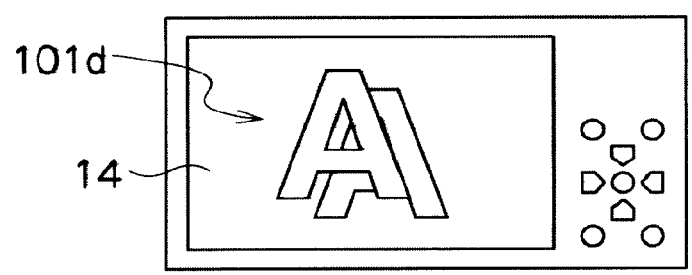

Next, as shown in FIG. 12C, a stereo image 101d is displayed, which is a version of the stereo image 101 having a parallax same as that of the stereo image 103 to be displayed next.

Description will now be made to the changes in parallaxes in this case with reference to FIG. 13. FIG. 13 is a graphical representation of changes in parallaxes of stereo images 101 and 103, in which the axis of abscissas represents time and the axis of ordinates represents a parallax of a displayed image. As shown, once frame-by-frame advance is indicated, the stereo image 101 having a predetermined parallax to the stereo image 101d having a parallax same as that of the stereo image 103 are displayed from time t20 to time t21 such that the parallaxes vary gradually. In the figure, although the parallaxes vary exponentially, the images may be displayed such that the parallaxes vary linearly. The duration from time t20 to time t21 is preferably on the order of 0.3 sec for normal speed frame-by-frame advance and on the order of 0.1 sec for middle speed frame-by-frame advance.

Figure 12D:
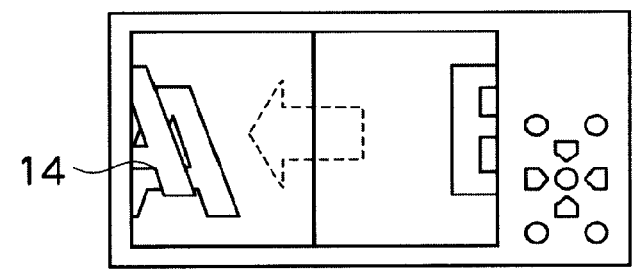

Thereafter, the stereo image 101d is switched with the stereo image 103 as shown in FIG. 12D. This duration corresponds to the duration from time t21 to time t22 in FIG. 13. The duration is preferably on the order of 0.4 sec for normal speed frame-by-frame advance and on the order of 0.1 sec for middle speed frame-by-frame advance.

Figure 12E:
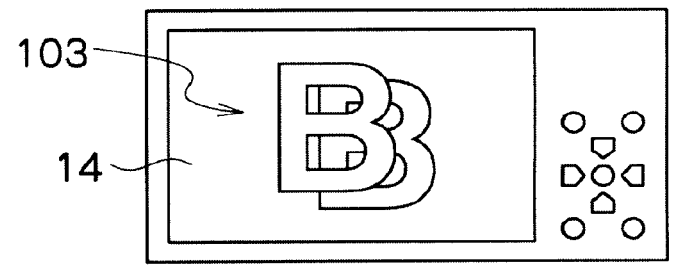

In this way, the stereo image 103 is displayed as shown in FIG. 12E. In this state, the user can stereoscopically view the stereo image 103.

In this way, when frame-by-frame advance is indicated while the stereo image is displayed, the parallax of the displayed stereo image is gradually changed until the parallax matches with that of the stereo image to be displayed next, and the next frame takes over once the parallax matches with that of the stereo image to be displayed next. With frame-by-frame advance performed in this manner, since stereo images having the same parallax are switched with each other, fatigue of the user's eyes caused by stereoscopy can be reduced.

In the embodiment, when frame-by-frame advance is indicated while the stereo image is displayed, the parallax of the displayed stereo image is gradually changed to that of the stereo image to be displayed next before frame transition. However, after frame transition in which a version of a stereo image to be displayed next whose parallax is changed to that of the displayed stereo image, the parallax of the stereo image may be restored to the original parallax.

Description will now be made to the changes in parallaxes in this case with reference to FIG. 14. FIG. 14 is a graphical representation of changes in parallaxes of stereo images 101 and 103, in which the axis of abscissas represents time and the axis of ordinates represents a parallax of a displayed image. As shown, once frame-by-frame advance is indicated, the stereo image 101 having a predetermined parallax on the display is switched with a stereo image 103d having the parallax of the stereo image 101 between time t31 to time t32.

Then, between time t32 to time t33, a number of stereo images 103c having different parallaxes are displayed in such a way that parallaxes vary gradually from the stereo image 103d having the parallax of the stereo image 101 to the stereo image 103. A number of such stereo images 103c having different parallaxes and the stereo image 103d having the parallax of the stereo image 101 are generated in advance in the stereo image signal processing section 11.

Even with frame-by-frame advance performed in this manner, since stereo images having the same parallax are switched with each other, fatigue of the user's eyes caused by stereoscopy can be reduced.

What is claimed is:

1. A stereo image display apparatus that causes a display device to display a stereo image having a parallax, wherein a stereo image of a current frame being displayed is sequentially advanced frame-by-frame to a stereo image of a next frame in response to a frame-by-frame advance indication, the apparatus comprising:
    a device that creates an image in which a predetermined parallax is reduced from a stereo image having the predetermined parallax,
    wherein when frame-by-frame advance is indicated, the stereo image of the next frame is displayed after a reduced-parallax image of the current frame in which a parallax is reduced from the stereo image of the current frame is displayed.

2. The stereo image display apparatus according to claim 1, a reduced-parallax image of the next frame in which a parallax is reduced from the stereo image of the next frame is displayed after the reduced-parallax image of the current frame is displayed, and then the stereo image of the next frame is displayed.

3. The stereo image display apparatus according to claim 1, wherein multiple images having parallaxes reduced from the stereo image of the current frame, the parallaxes varying from the parallax of the stereo image of the current frame to a predetermined parallax smaller than the parallax of the stereo image of the current frame, are displayed in descending order, and then the reduced-parallax image of the current frame is displayed.

4. The stereo image display apparatus according to claim 1, wherein multiple images having parallaxes reduced from the stereo image of the next frame, the parallaxes varying from a predetermined parallax smaller than the parallax of the stereo image of the next frame to the parallax of the stereo image of the next frame, are displayed in ascending order, and then the stereo image of the next frame is displayed.

5. The stereo image display apparatus according to claim 3, wherein display duration and/or numbers of the multiple images are switched according to advance speed of the frame.

6. The stereo image display apparatus according to claim 4, wherein display duration and/or numbers of the multiple images are switched according to advance speed of the frame.

7. The stereo image display apparatus according to claim 1, wherein the reduced-parallax image of the current frame is an image having no parallax.

8. The stereo image display apparatus according to claim 2, wherein the reduced-parallax image of the next frame is an image having no parallax.

9. The stereo image display apparatus according to claim 7, wherein the frame-by-frame advance includes normal-speed frame advance and high-speed frame advance, and wherein when the high-speed frame advance is indicated, only images created by removing parallaxes of stereo images to be advanced frame-by-frame are displayed and advanced frame-by-frame.

10. The stereo image display apparatus according to claim 7, wherein when the image having no parallax is displayed, an indication that a source image of the image having no parallax is a stereo image is displayed.

11. A stereo image display method that causes a display device to display a stereo image having a parallax, wherein a stereo image of a current frame being displayed is sequentially advanced frame-by-frame to a stereo image of a next frame in response to a frame-by-frame advance indication, comprising:
    a step of creating an image in which a predetermined parallax is reduced from a stereo image having the predetermined parallax,
    wherein when frame-by-frame advance is indicated, the stereo image of the next frame is displayed after a reduced-parallax image of the current frame in which a parallax is reduced from the stereo image of the current frame is displayed.

12. A stereo image display apparatus that causes a display device to display a stereo image having a parallax, wherein a stereo image of a current frame being displayed is sequentially advanced frame-by-frame to a stereo image of a next frame at a predetermined interval in a slideshow, the apparatus comprising:
    a device that creates an image in which a predetermined parallax is reduced from a stereo image having the predetermined parallax,
    wherein in frame-by-frame advance, the stereo image of the next frame is displayed after a reduced-parallax image of the current frame in which a parallax is reduced from the stereo image of the current frame is displayed.

13. The stereo image display apparatus according to claim 12, wherein in the frame-by-frame advance, a reduced-parallax image of the next frame in which a parallax is reduced from the stereo image of the next frame is displayed after the reduced-parallax image of the current frame is displayed, and then the stereo image of the next frame is displayed.

14. The stereo image display apparatus according to claim 12, wherein in the frame-by-frame advance, multiple images having parallaxes reduced from the stereo image of the current frame, the parallaxes varying from the parallax of the stereo image of the current frame to a predetermined parallax smaller than the parallax of the stereo image of the current frame, are displayed in descending order, and then the reduced-parallax image of the current frame is displayed.

15. The stereo image display apparatus according to claim 12, wherein in the frame-by-frame advance, multiple images having parallaxes reduced from the stereo image of the next frame, the parallaxes varying from a predetermined parallax smaller than the parallax of the stereo image of the next frame to the parallax of the stereo image of the next frame, are displayed in ascending order, and then the stereo image of the next frame is displayed.

16. The stereo image display apparatus according to claim 12, wherein the reduced-parallax image of the current frame is an image having no parallax.

17. The stereo image display apparatus according to claim 13, wherein the reduced-parallax image of the next frame is an image having no parallax.

18. The stereo image display apparatus according to claim 12, wherein the frame-by-frame advancing device is performed with sliding-out/sliding-in or fading-out/fading-in.

19. A stereo image display method that causes a display device to display a stereo image having a parallax, wherein a stereo image of a current frame being displayed is sequentially advanced frame-by-frame to a stereo image of a next frame at a predetermined interval in a slideshow, comprising:
- a step of creating an image in which a predetermined parallax is reduced from a stereo image having the predetermined parallax,
- wherein in frame-by-frame advance, the stereo image of the next frame is displayed after a reduced-parallax image of the current frame in which a parallax is reduced from the stereo image of the current frame is displayed.

* * * * *